US011559893B2

(12) United States Patent
Cassero

(10) Patent No.: US 11,559,893 B2
(45) Date of Patent: Jan. 24, 2023

(54) ROBOT CONTROL FOR AVOIDING SINGULAR CONFIGURATIONS

(71) Applicant: Intrinsic Innovation LLC, Mountain View, CA (US)

(72) Inventor: Sean Alexander Cassero, Palo Alto, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 247 days.

(21) Appl. No.: 16/838,641

(22) Filed: Apr. 2, 2020

(65) Prior Publication Data

US 2021/0308864 A1 Oct. 7, 2021

(51) Int. Cl.
*B25J 9/16* (2006.01)

(52) U.S. Cl.
CPC ........... *B25J 9/1666* (2013.01); *B25J 9/163* (2013.01); *B25J 9/1607* (2013.01); *B25J 9/1664* (2013.01); *G05B 2219/37365* (2013.01); *G05B 2219/40354* (2013.01); *G05B 2219/50391* (2013.01)

(58) Field of Classification Search
CPC ...... B25J 9/1607; B25J 9/1664; B25J 9/1666; B25J 9/1643; B25J 9/163; B25J 9/1605; B25J 9/1671; B25J 9/023; G05B 2219/40354; G05B 2219/39257; G05B 2219/40371; G05B 2219/39381; G05B 2219/40333; G05B 2219/40381; G05B 2219/37365; G05B 2219/40471; G05B 2219/39399; G05B 2219/50391
See application file for complete search history.

(56) References Cited

U.S. PATENT DOCUMENTS

| 5,412,759 | A | 5/1995 | Yano et al. | |
|---|---|---|---|---|
| 9,149,931 | B2 | 10/2015 | Kamiya | |
| 9,382,643 | B2 | 7/2016 | Moore et al. | |
| 10,065,311 | B1 * | 9/2018 | Buschmann | B25J 9/1664 |
| 10,668,623 | B2 | 6/2020 | Zhang et al. | |
| 2003/0171847 | A1 * | 9/2003 | Cheng | G05B 19/4103 318/568.11 |
| 2008/0058990 | A1 | 3/2008 | Sassatelli et al. | |
| 2015/0045954 | A1 * | 2/2015 | Negishi | B25J 9/1607 700/262 |
| 2020/0070347 | A1 * | 3/2020 | Denenberg | B25J 13/08 |
| 2021/0001483 | A1 * | 1/2021 | Milenkovic | B25J 9/046 |

FOREIGN PATENT DOCUMENTS

| CN | 110850807 A | * | 2/2020 | ............. G05B 19/19 |
|---|---|---|---|---|
| JP | 2015066668 A | * | 4/2015 | ................ B25J 9/10 |

* cited by examiner

*Primary Examiner* — Khoi H Tran
*Assistant Examiner* — Tanner L Cullen
(74) *Attorney, Agent, or Firm* — Fish & Richardson P.C.

(57) ABSTRACT

Methods, systems, and apparatus, including computer programs encoded on computer storage media, for avoiding singular configurations of a robot. A singular configuration of the robot is obtained. A location of an end effector of the robot when the robot is in the singular configuration is determined. For each of a plurality of voxels in a workcell, a distance from the voxel to the location of the end effector when the robot is in the singular configuration is computed. A negative potential gradient of the computed distance is computed. Control rules are generated, wherein the control rules, when followed by the robot, offset the trajectory of the robot according to the negative potential gradient.

28 Claims, 8 Drawing Sheets ic movements.

ROBOT CONTROL FOR AVOIDING SINGULAR CONFIGURATIONS

BACKGROUND

This specification relates to robotics, and more particularly to controlling robotic movements.

Robotics control refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

Some robots can be programmed to perform online adaptation processes in order to react to changing situations in a workcell. To do so, a robot can dynamically compute a desired location and position in Cartesian space and then use inverse kinematics to determine the joint velocities that are needed to achieve the desired location and position.

However, such online adaptation processes often run into problematic configurations that are known as singular configurations. In this specification, a singular configuration is a configuration of the joints in the robot that severely limits control in one or more degrees of freedom. Often this means that velocity in one Cartesian degree of freedom is difficult or impossible or requires a disproportionate amount of joint velocity to achieve.

Singular configurations are problematic because they introduce uncertainty, delays, and safety risks into a robot plan. They slow down the robotics process because often high joint velocities are required to handle them that result in the end effector moving slowly in Cartesian space.

SUMMARY

This specification describes how a system can precompute singular configurations for a particular robot and automatically avoid singular configurations at runtime.

Particular embodiments of the subject matter described in this specification can be implemented so as to realize one or more of the following advantages. The singular configurations and control rules are determined prior to execution. During execution, the control rules ensure that the trajectory of the robot avoids singular configurations. The determination of the singular configurations is computationally expensive. In comparison, the enforcement of the control rules is significantly less expensive in terms of computation. By determining the singular configuration and the control rules prior to execution, the singular configurations can be automatically avoided during execution without introducing any significant delay. As such, uncertainty, delays, and safety risks related to singular configurations can be avoided without introducing any significant delay. This improves the speed and safety of robotic operations. In addition, singularity avoidance can occur in a deterministic time frame, which allows the singularity avoidance process to be run online in hard real time systems.

The enforcement of the control rules is not computationally expensive and can therefore be done online without introducing any significant delay. The singular configurations can thus be automatically avoided during execution without introducing any significant delay. This improves the speed and reactivity of robotic operations, as well as the reliability and safety. The control rules allow even a robot with hard real-time constraints to dynamically account for and avoid singular configurations, even when computing singular configurations is not possible at runtime.

Moreover, the control rules can be enforced at a low level of the software stack. Lower levels generally have better real-time performances than higher levels of the software stack. In particular, the control rules can be enforced downstream of motion planning. Offsetting the trajectory according to a negative potential gradient is significantly less expensive in terms of computation than computing a trajectory that avoids singular configurations during motion planning. As such, the singular configurations can be automatically avoided during execution without introducing any significant delay. This enables online trajectory planners to perform singular configuration avoidance in hard real time systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
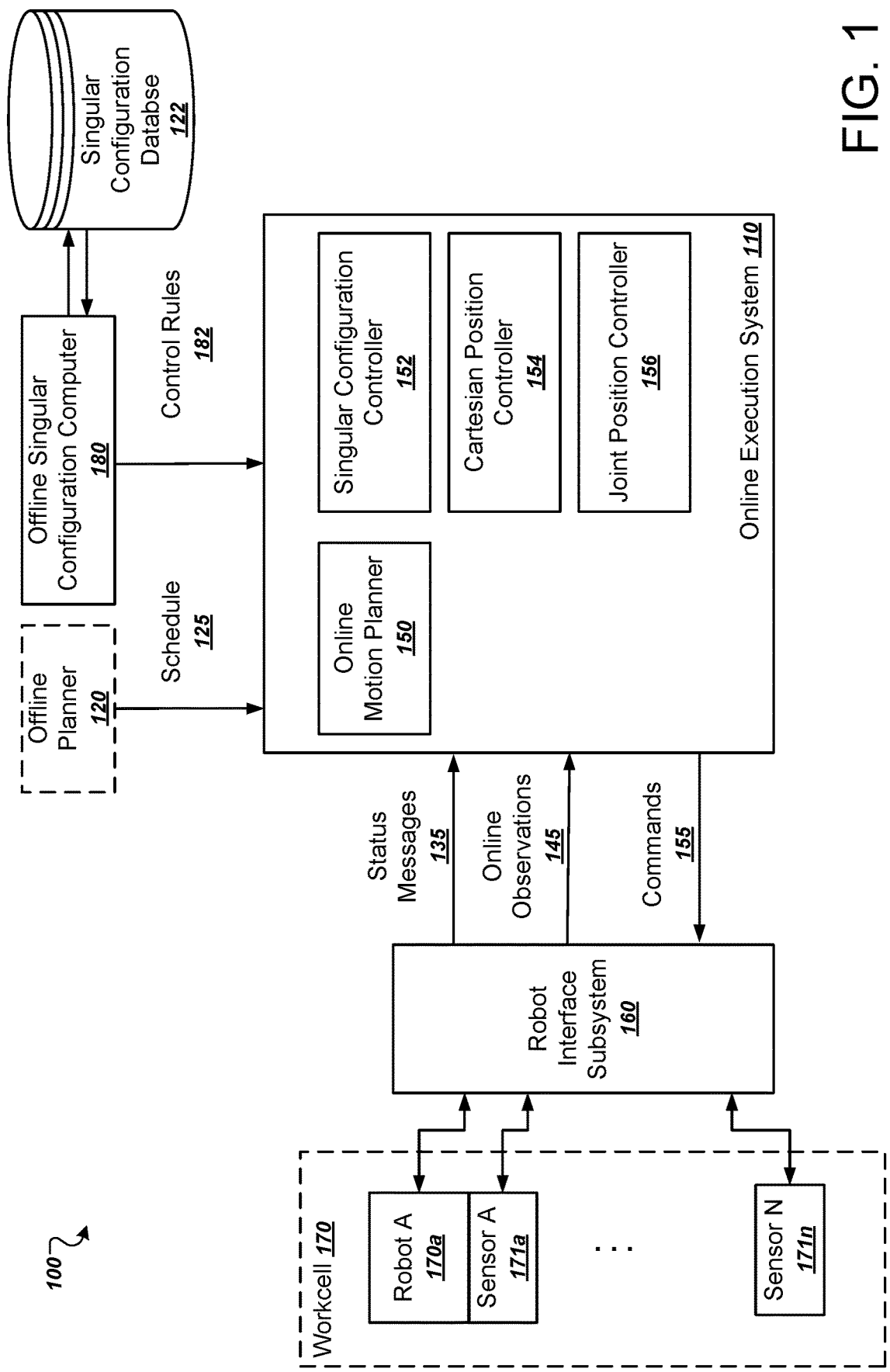
FIG. 1 is a diagram that illustrates an example system for controlling a robot.

FIG. 1 is a diagram that illustrates an example system 100. The system 100 is an example of a system that can implement the online robotic control techniques described in this specification.

The system 100 includes a number of functional components, including an online execution system 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 110 provides commands 155 to be executed by the robot interface subsystem 160, which drives a robot, e.g., robot 173, in a workcell 170. A workcell is the physical environment in which a robot will operate. Workcells have particular physical properties, e.g., physical dimensions that impose constraints on how robots can move within the workcell.

In order to compute the commands 155, the online execution system 110 consumes status messages 135 generated by the robot 173 and online observations 145 made by one or more sensors 171a-n making observations within the workcell 170. A robot can have multiple sensors, and the sensors can be mounted on stationary or movable surfaces in the workcell 170.

The online execution system 110 issues commands 155 to the robot interface system 160 in order to actually drive the movements of the moveable components, e.g., the joints, of the robot 173. In some implementations, the robot interface subsystem 160 provides a hardware-agnostic interface so that the commands 155 issued by onsite execution engine 150 are compatible with multiple different versions of robots. During execution the robot interface subsystem 160 can report status messages 135 back to the online execution system 110 so that the online execution system 150 can make online adjustments to the robot movements, e.g., due to local faults or other unanticipated conditions.

The robot interface subsystem 160 and the online execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command periodically, such as every 5 milliseconds, while the online requirements of the online execution system 110 specify that the online execution system 110 should provide a command 155 to the robot interface subsystem 160 at a lower frequency, such as every 20 milliseconds or every second. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

The system 100 can also optionally include an offline planner 120. The overall goal of the offline planner 120 is to generate, from a definition of one or more tasks to be performed, a schedule that will be executed by the robot 170a to accomplish the tasks. In this specification, a schedule is data that assigns each task to at least one robot. A schedule also specifies, for each robot, a sequence of actions to be performed by the robot. A schedule also includes dependency information, which specifies which actions must not commence until another action is finished. A schedule can specify start times for actions, end times for actions, or both.

The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 170. On the other hand, the online execution engine 110 is typically local to the facility that houses the workcell 170.

This arrangement thus provides three different computing zones. The offline planner 120 can use massive cloud-based computing resources to consider many possibilities for scheduling tasks, while also allowing for online reaction to unanticipated events by the online execution engine 150, while also providing the precision and real-time safety mechanisms of the robot interface subsystem 160. In execution, the robot 173 generally continually executes the commands specified explicitly or implicitly by motion plans to perform the various tasks or transitions of the motion plan. The robot can be a real-time robot, which means that the robot is programmed to continually execute its commands according to a highly constrained timeline. It also means that the robot is guaranteed to finish its computation within a fixed time frame. For example, the robot can expect a command from the robot interface subsystem 160 at a particular frequency, e.g., 100 Hz or 1 kHz. If the robot does not receive a command that is expected, the robot can enter a fault mode and stop operating.

A singular configuration database 122 includes a precomputed number of singular configurations. The data enumerating the singular configurations can be downloaded over the internet during the robot initialization. The data enumerating the singular configurations can also be pre-downloaded by a manufacturer of the robot.

The system 100 can also include an offline singular configuration computer 180. The offline singular configuration computer 180 computes singular configurations of the robot 170a and generates control rules 182 for automatically avoiding the singular configurations during the movement of the robot. The offline singular configuration computer 180 can also store the singular configurations of the robot in the singular confirmation database 122.

In execution, the singular configuration controller 152 receives an initial Cartesian trajectory in the Cartesian space. For example, the onsite execution engine 150 (e.g., an online motion planner) sends Cartesian goals occasionally or periodically (e.g., at a 1 Hz frequency). Alternatively, the onsite execution engine 150 sends a motion plan that defines a sequence of Cartesian goals that the robot must take to accomplish a task. The robot interface subsystem 160 (e.g., the real-time software control system) generates the initial Cartesian trajectory based on the Cartesian goals. This initial Cartesian trajectory interpolates between the previously received Cartesian goal and the newly received Cartesian goal. The initial Cartesian trajectory is defined by a sequence of Cartesian-space poses. Each Cartesian-space pose defines the location of an end effector of the robot in the workcell. The initial Cartesian trajectory might pass through a singularity point. The initial Cartesian trajectory output by the robot interface subsystem 160 is passed through the singular configuration controller 152. The singular configuration controller 152 modifies the initial Cartesian trajectory to avoid singular configurations. More specifically, the singular configuration controller 152 enforces the control rules 182 on the initial Cartesian trajectory, and passes the modified Cartesian trajectory to the Cartesian position controller 154. The Cartesian position controller 154 converts the modified Cartesian trajectory to joint space, and passes a resulting joint space trajectory to a joint position controller 156. This process is described in more detail below with reference to FIG. 2.

Figure 2:
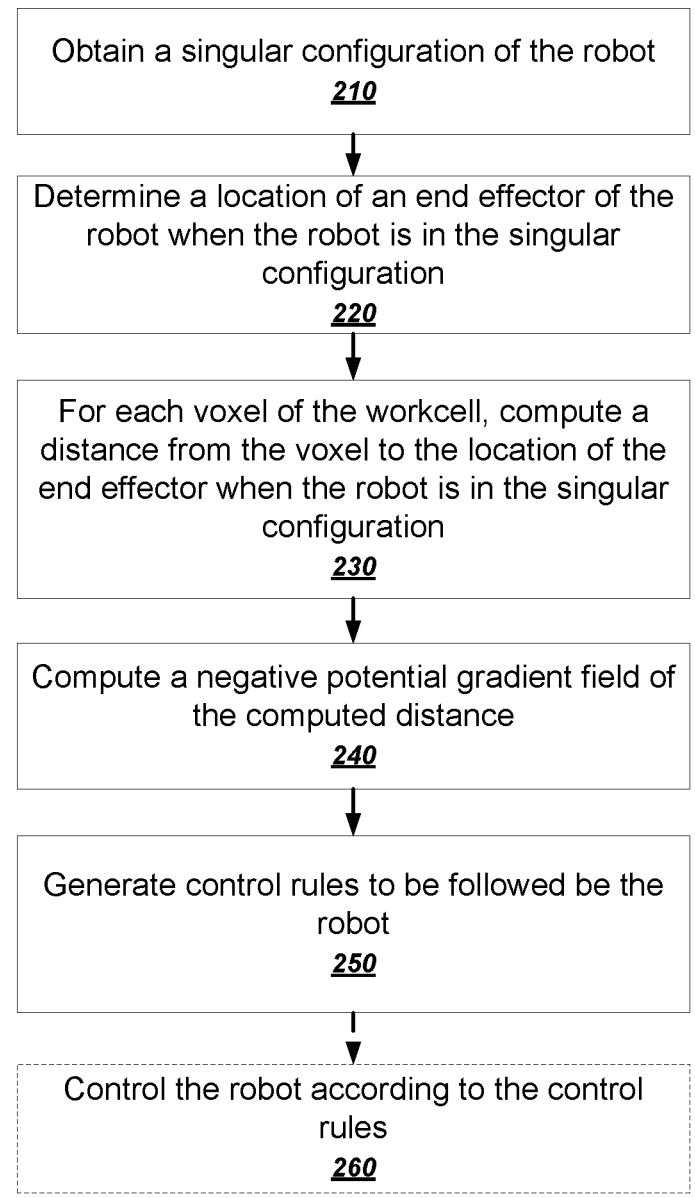
FIG. 2 is a flowchart of an example process for configuring a robot to avoid singular configurations at runtime.

FIG. 2 is a flowchart of an example process for automatically avoiding singular configurations at runtime. The process can be implemented by one or more computer programs installed on one or more computers in one or more locations and programmed in accordance with this specification. For example, the offline part of the process can be performed by the offline singular configuration computer 180 shown in FIG. 1. For convenience, the process will be described as being performed by a system of one or more computers.

The system obtains one or more singular configurations of the robot (210). In some embodiments, the singular configurations are computed by the singular configuration computer 180 prior to execution. In particular, the singular configuration can be computed during initialization of the robot.

Figure 3:
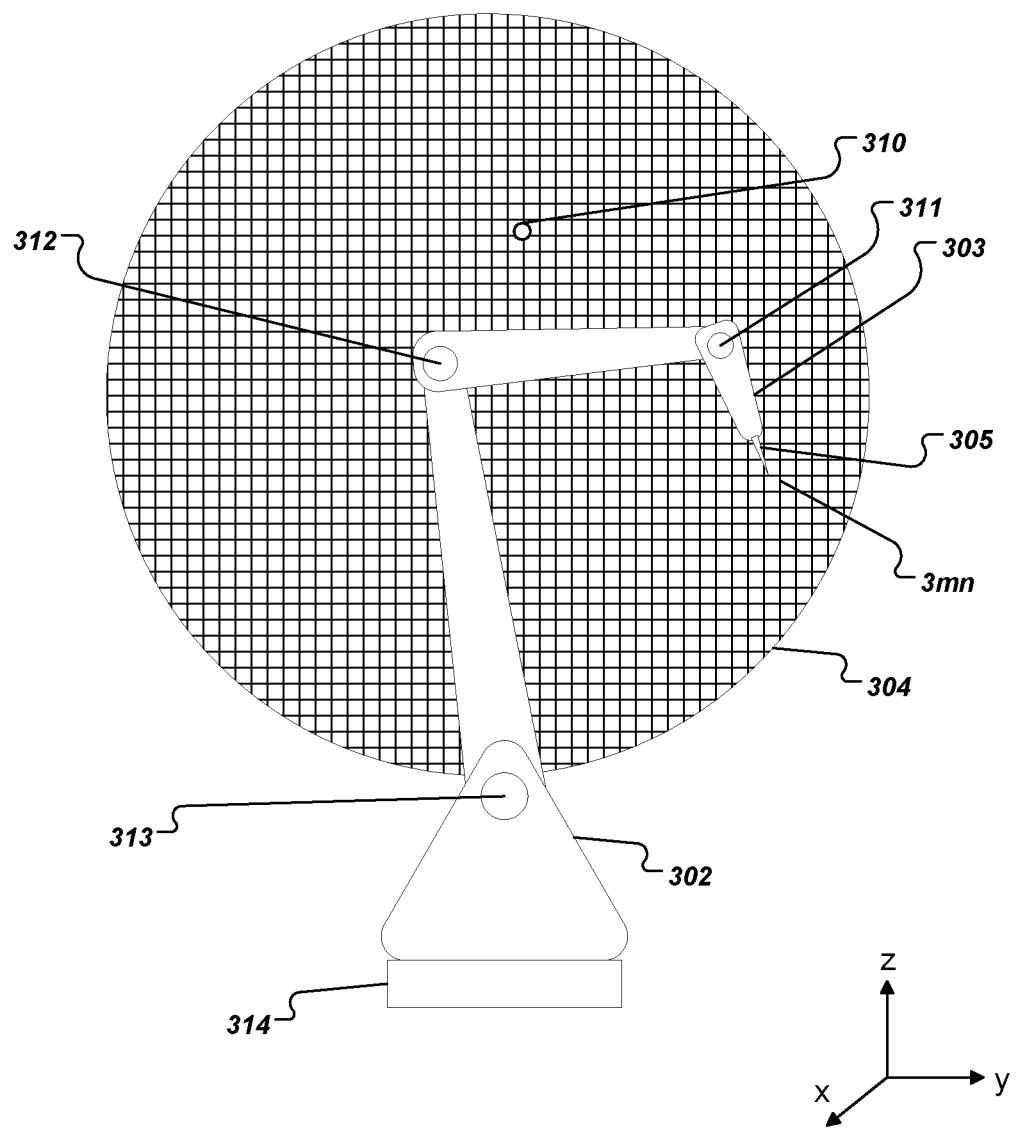
FIG. 3 is an illustration of a workcell of a robot.

As shown on FIG. 3, the robot 302 includes an arm 303 and an end effector 305 at the end of the arm 303. The arm 303 includes a plurality of joints 311-314. The end effector 305 can be a tool, such as a welding device, spray gun, or a gripper. For a given robot, a configuration of the robot is defined by the angles of each of the joints 311-314 of the robot. The configuration of the robot determines the location of the end effector 305. A given location of the end effector 305 may correspond to one or more configurations of the robot.

The location of the end effector 305 in the workcell 304 (or Cartesian-space pose) can be defined by a set of Cartesian coordinates in a Cartesian coordinate system (x, y, z). A Cartesian coordinate system for a three-dimensional space consists of three axes (x, y, z) that go through a common point, and are pairwise perpendicular. A set of Cartesian coordinates is a set of three numerical coordinates (x, y, z), which are the signed distances to the point from three axes, as well as three rotational coordinates (rx, ry, rz) that define the robot end effector orientation at the (x, y, z) coordinate. Kinematic equations map the joint parameters (e.g., angle) and the set of Cartesian coordinates. The dimensions of the robot 302 and its kinematic equations define the volume of the workcell 304, which is the space reachable by the robot 302.

A singular configuration is a configuration of the joints in the robot that severely limits control in one or more degrees of freedom. Various methods exist to mathematically derive singular configurations and what is or is not considered one will depend on the method by which they are derived. In particular, singular configurations of the robot can be identified based on its Jacobian. The Jacobian of the robot relates the joint velocity to the linear and angular velocity of the end-effector. The Jacobian of the robot is computed by computing the time derivative of the kinematic equations. The configurations where the Jacobian does not have an inverse are the singular configurations of the robot. The database of singular configurations 122 stores the singular configurations computed for the robot.

The system determines the location of the end effector 305 of the robot when the robot is in the singular configuration (220). In the specification, the location of the end effector 305 when the robot is in the singular configuration is called a singular point 310. A singular point 310 is defined by at least a set of joint Coordinates. A singular configuration can be defined by a set of Cartesian coordinates when there is only one Jacobian that satisfies the Cartesian-space pose. Depending on the kinematics, there could be multiple joint configurations corresponding to a Cartesian-space pose, where one of these joint configurations is further from singularity than other ones. In that case, a singular point 310 is defined by a set of Cartesian coordinates, as well as the solution to the robot kinematic equations at the set of Cartesian coordinates.

If a plurality of singular configurations have been identified, the system determines, for each singular configuration, the location of the end effector 305 when the robot is in that singular configuration. Each singular configuration defines a singular point 310. The singular point 310 is the location of the end effector, when a singular point is defined by a set of Cartesian coordinates. The singular point 310 is the set of joint coordinates, when a singular point is defined by a set of Cartesian coordinates and the solution to the kinematics equations at the set of the Cartesian coordinates. 305. The database of singular configurations 122 stores the singular points 310 of the robot.

As shown in FIG. 2, the system computes, for each voxel of a plurality of voxels, a distance from the voxel to the location of the end effector 305 when the robot is in the singular configuration (230). As shown on FIG. 3, a representation of the workcell 304 is divided in an array of discrete elements of volume. Each element of volume is a voxel 3 mn. For every voxel 3 mm in the workcell 304, the distance of the given voxel 3 mn to the singular point is determined. Each voxel is mapped to its distance to the singular point. A distance from the voxel to the singular point is computed for each of the plurality of singular configurations. Each voxel is mapped to its distance to the location of the nearest singular point 310. The resulting map is a potential field of the distance to the singular points.

Figure 4:
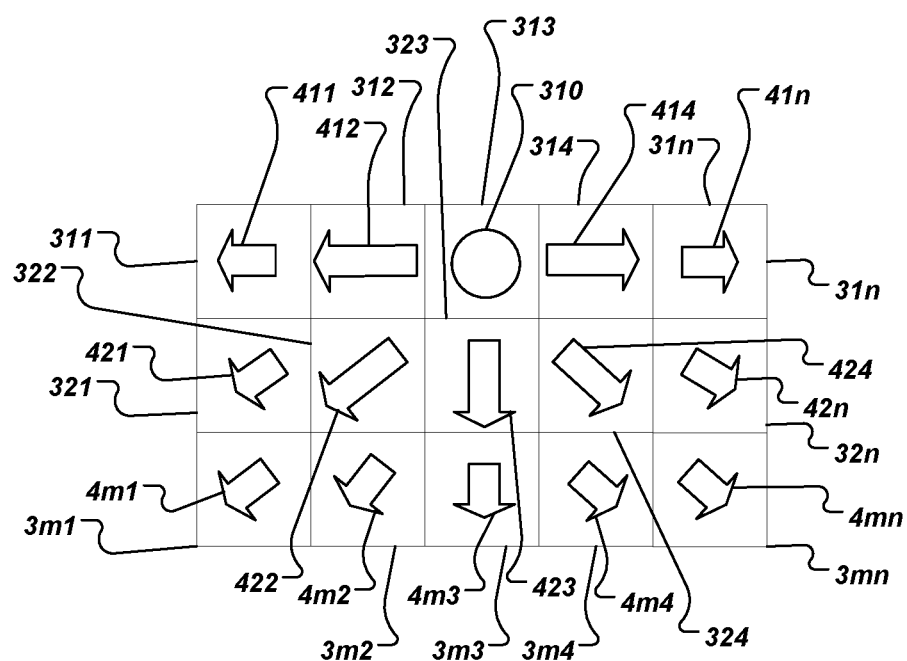
FIG. 4 is an illustration of a potential field in the neighborhood of a singular configuration of the robot.

As shown in FIG. 2, the system computes a negative potential gradient of the computed distance to the singular points (240). As shown on FIG. 4, a negative potential gradient represents the inverse of how the distance to the singular points 310 changes with position.

If the kinematic equations provide a bijective mapping between a Cartesian-space pose and a joint configuration, the negative potential gradient is, in the Cartesian space, the sum of the potential gradients along each Cartesian axis. The potential gradient along each Cartesian axis is the local rate at which the distance to the singular points 310 changes with position in the direction of the Cartesian axis. For each voxel, the local value of the negative potential gradient is a vector 411-4 mn that represents the inverse of how the distance to the singular points 310 changes in the proximity of the voxel. In coordinates, the negative potential gradient field can be represented as a vector-valued function that associates a 3-tuple of real numbers to each voxel 3 mn of the workcell.

If the kinematic equations associate multiple joint configurations to a Cartesian-space pose, the analysis for singular configurations is performed for a given Cartesian-space pose and for a given kinematic joint configuration that satisfies that Cartesian-space pose. In that case, the potential gradient is a function of the Cartesian-space pose and of the joint angles. Alternatively, a continuous collection of joint configurations that solve a Cartesian-space pose is discretized into a range of discrete solutions, and the analysis for singular configurations is performed over the range of discrete solutions.

As the distance from the singular configuration increases, the magnitude of the negative potential gradient keeps on decreasing. A magnitude of the negative potential gradient can be inversely proportional to the distance from the singular configurations. In the case of a single singular configuration in the workcell, vectors 411-4 mn point away from the singular configuration. In the case of multiple singular configurations in the workcell, each singular configuration acts as a source, with vectors 411-4 mn pointing away from the sources.

As shown in FIG. 2, the system generates control rules to be followed by the robot during execution (250). The control rules are generated based on the negative potential gradient field. The control rules, when followed by the robot, offset the trajectory of the robot according to the negative potential gradient. The control rules ensure that the trajectory of the robot avoids singular configurations. The control rules can be stored in the singular configuration database 122.

In execution, the robot is controlled according to the control rules (260). This process is described in more detail below with reference to FIG. 6.

Figure 6:
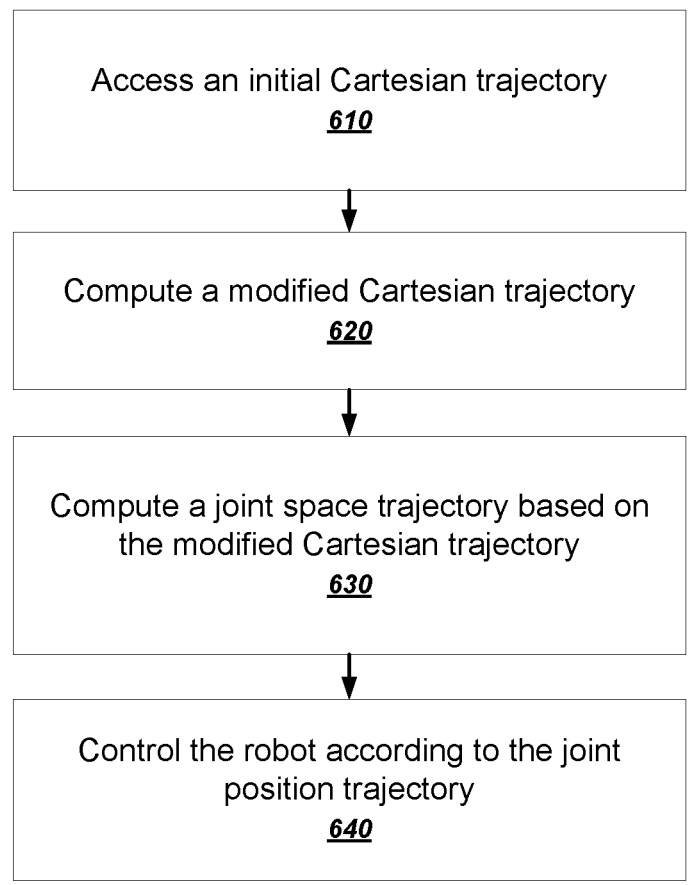
FIG. 6 is a flowchart of an example process for automatically avoiding singular configurations at runtime.

As shown in FIG. 6, the system (e.g., the singular configuration controller 152) accesses an initial Cartesian trajectory (610). The initial Cartesian trajectory is defined by a sequence of Cartesian-space poses. A Cartesian-space pose determines a location of the end effector in the workcell in Cartesian space. A Cartesian-space pose can be defined by a set of Cartesian coordinates.

In particular, the system can receive Cartesian goals. The Cartesian goals can be received from the onsite execution engine 150 (e.g., from an online motion planner). In particular, the singular configuration controller 152 can receive a motion plan that defines a sequence of Cartesian goals that the robot must take to accomplish a task. The robot interface subsystem 160 (e.g., the real-time software control system) generates an initial Cartesian trajectory based on the Cartesian goal. This initial Cartesian trajectory interpolates between the previously received Cartesian goal and the newly received Cartesian goal.

Figure 5A:
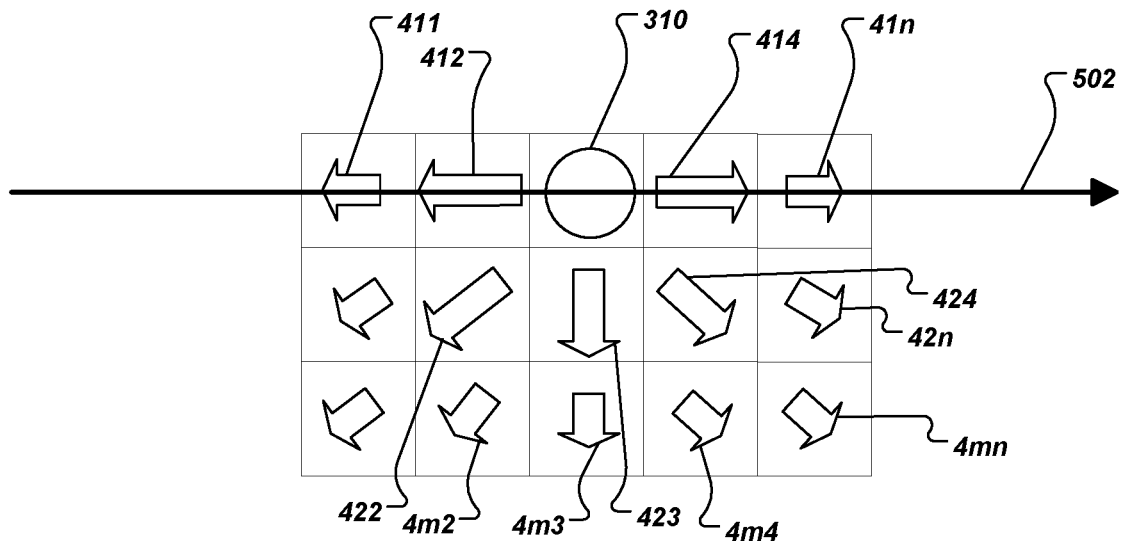
FIG. 5A illustrates a trajectory of the robot according to a motion plan.
Figure 5B:
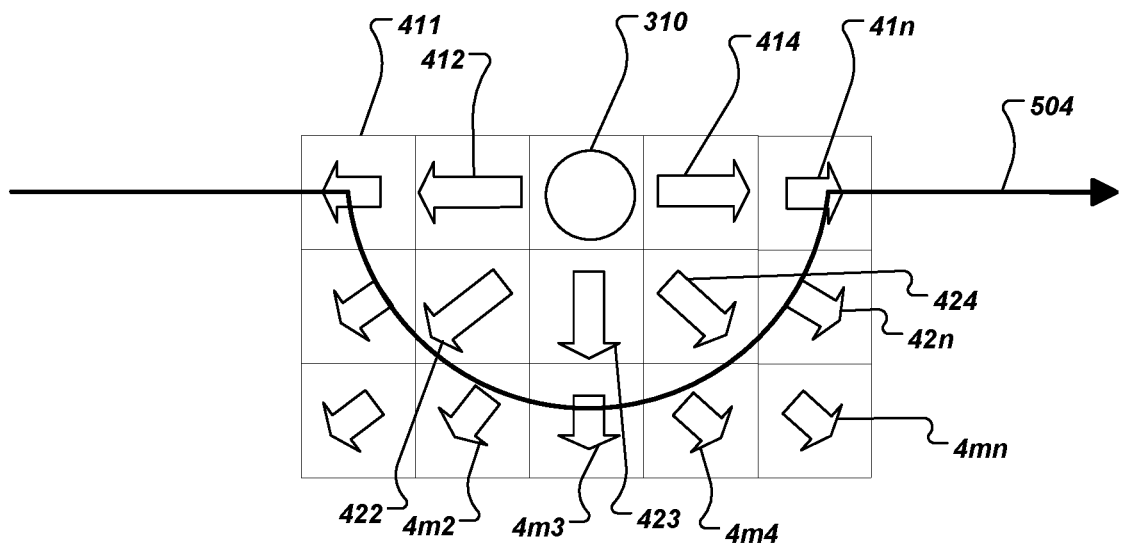
FIG. 5B illustrates the trajectory of the robot adjusted according to the negative potential gradient.

The system (e.g., the singular configuration controller 152) computes a modified Cartesian trajectory by enforcing the control rules on the initial Cartesian trajectory (620). As shown on FIG. 5A, an initial trajectory of the robot, according to a motion plan, passes through a singular point 310. As shown on FIG. 5B, the trajectory of the robot is offset according to the negative potential gradient. Each Cartesian-space pose of the initial Cartesian trajectory is displaced according to the local value of the negative potential gradient field 411-4 mn. The local value of the negative potential gradient field 411-4 mn is the vector defined by the value of the negative potential gradient in the voxel in which the Cartesian-space pose is located. In particular, the Cartesian-space pose is displaced in the direction of the local value of the negative potential gradient field 411-4 mn. The displacement of the Cartesian-space pose in the direction of the local value of the negative potential gradient field 411-4 mn can be proportional to the magnitude of the local value of the negative potential gradient field 411-4 mn. The resulting modified Cartesian poses define the modified Cartesian trajectory.

The system (e.g., the Cartesian position controller 154) computes a joint space trajectory based on the modified Cartesian trajectory (630). The system converts the modified Cartesian trajectory to joint space. To that end, the system can use inverse kinematics solvers to compute the joint space pose for a given Cartesian-space pose. The Cartesian position controller 152 then passes the joint space poses to a joint position controller 156.

The joint position controller 156 controls the robot according to the joint position trajectory (640). In particular, the joint position controller can be part of the software stack described below.

The enforcement of the control rules is not computationally expensive and can therefore be done with real time constraints without introducing any significant delay. The singular configurations can thus be automatically avoided during execution without introducing any significant delay. This improves the speed and reactivity of robotic operations. The control rules allow even a robot with hard real-time constraints to dynamically account for and avoid singular configurations, even when computing singular configurations is not possible at runtime.

Figure 7:
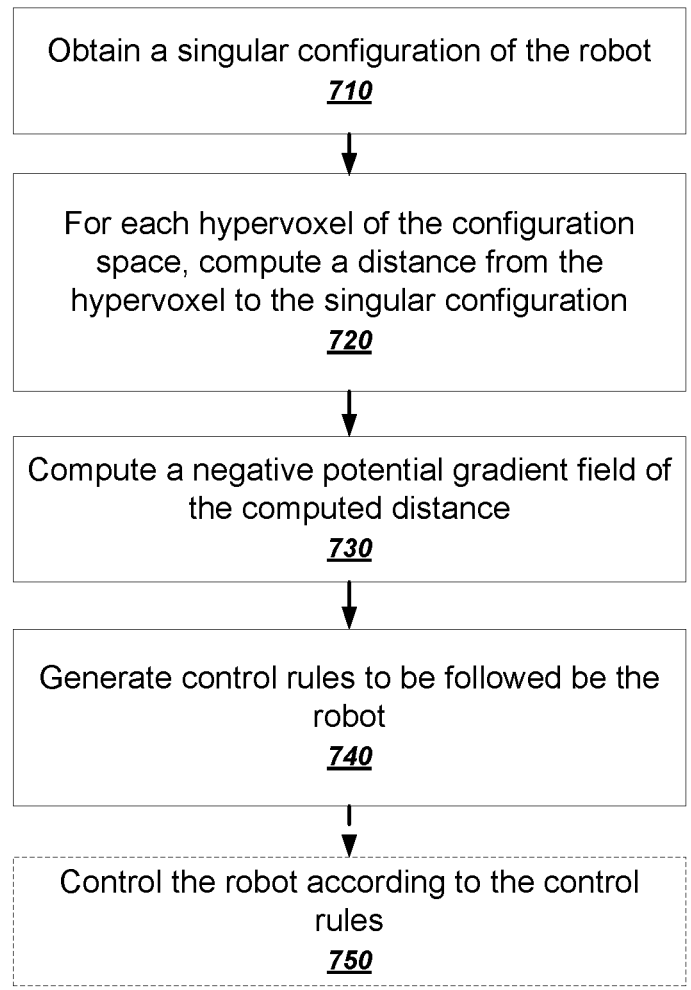
FIG. 7 is a flowchart of another example process for configuring a robot to avoid singular configurations at runtime.

FIG. 7 is a flowchart of another example process for automatically avoiding singular configurations at runtime. The process can be implemented by one or more computer programs installed on one or more computers in one or more locations and programmed in accordance with this specification. For example, the offline part of the process can be performed by the offline singular configuration computer 180 shown in FIG. 1. For convenience, the process will be described as being performed by a system of one or more computers.

The system obtains one or more singular configurations of the robot (710). The singular configurations can be obtained as described in relation to FIG. 2 (e.g., 210).

The system computes, for each hypervoxel of a plurality of hypervoxels, a distance from the hypervoxel to the singular configuration (720). A representation of the configuration space is divided in an array of discrete elements of the N-dimensional space, wherein N is the number of degrees of freedom of the robot. The configuration space is the ensemble of all the configurations that the robot can take. Each discrete element of the N-dimensional space is a hypervoxel. For every hypervoxel in the configuration space, the distance of the given hypervoxel to the singular configuration is determined. Each hypervoxel is mapped to its distance to the singular configuration. A distance from the hypervoxel to the singular configuration is computed for each of the plurality of singular configurations. Each hypervoxel is mapped to its distance to the nearest singular configuration. The resulting map is a potential field of the distance to the singular configurations.

The system computes a negative potential gradient of the computed distance to the singular configurations (730). The negative potential gradient represents the inverse of how the distance to the singular configurations changes with position in the configuration space.

For each hypervoxel, the local value of the negative potential gradient is a vector that represents the inverse of how the distance to the singular configuration changes in the proximity of the hypervoxel. In the configuration space, the negative potential gradient field can be represented as a vector-valued function that associates a N-tuple of real numbers to each hypervoxel of the workcell. As the distance from the singular configuration increases, the magnitude of the negative potential gradient keeps on decreasing. A magnitude of the negative potential gradient can be inversely proportional to the distance from the singular configurations.

The system generates control rules to be followed by the robot during execution (740). The control rules are generated based on the negative potential gradient field. The control rules, when followed by the robot, offset the trajectory of the robot according to the negative potential gradient. The control rules ensure that the trajectory of the robot avoids singular configurations. The control rules can be stored in the singular configuration database 122.

In execution, the robot is controlled according to the control rules (750). This process is described in more details in relation to FIG. 8.

Figure 8:
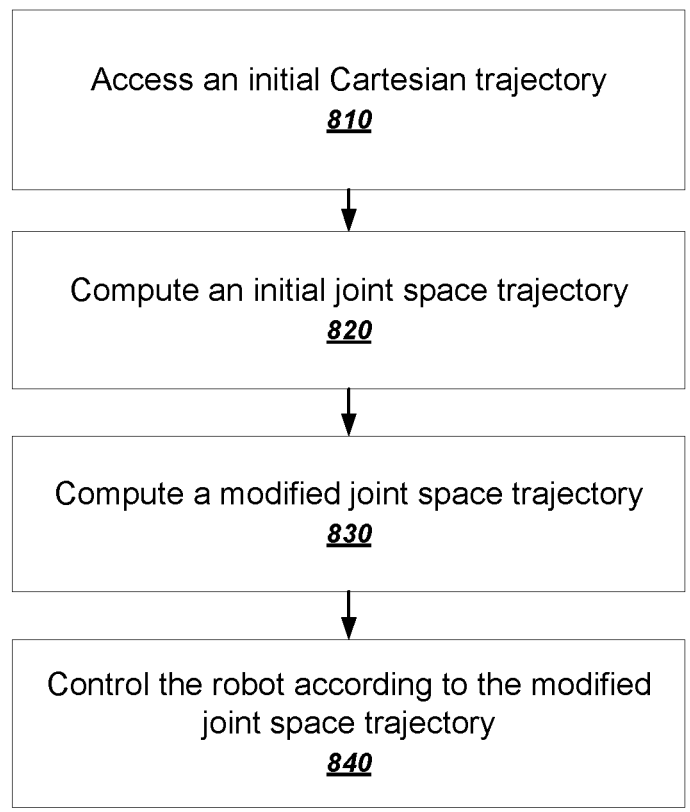
FIG. 8 is a flowchart of another example process for automatically avoiding singular configurations at runtime.

As shown in FIG. 8, the system (e.g., the Cartesian position controller 154) accesses an initial Cartesian trajectory (810). The initial Cartesian trajectory is defined by a sequence of Cartesian-space poses. A Cartesian-space pose determines a location of the end effector in the workcell in Cartesian space. A Cartesian-space pose can be defined by a set of Cartesian coordinates.

In particular, the system can receive Cartesian goals. The Cartesian goals can be received from the onsite execution engine 150 (e.g., from an online motion planner). In particular, the singular configuration controller 152 can receive a motion plan that defines a sequence of Cartesian goals that the robot must take to accomplish a task. The robot interface subsystem 160 (e.g., the real-time software control system) generates an initial Cartesian trajectory based on the Cartesian goal. This initial Cartesian trajectory interpolates between the previously received Cartesian goal and the newly received Cartesian goal.

The system (e.g., the Cartesian position controller 154) computes an initial joint space trajectory (820). The system converts the initial Cartesian trajectory to joint space. This results in an initial joint space trajectory. To that end, the system can use inverse kinematics solvers to compute the Cartesian-space poses in joint space. The Cartesian position controller 154 then passes the initial joint space trajectory to the singular configuration controller 152.

The system (e.g., the singular configuration controller 152) computes a modified joint space trajectory by enforcing the control rules on the initial joint space trajectory (830). If the initial joint space trajectory of the robot, according to a motion plan, passes through a singular configuration, the trajectory of the robot is offset according to the negative potential gradient. Each joint space pose of the initial joint space trajectory is displaced according to the local value of the negative potential gradient field. The local value of the negative potential gradient field is the vector defined by the negative potential gradient in the hypervoxel in which the joint space pose is located. In particular, the joint configuration pose is displaced in the direction of the local value of the negative potential gradient. The displacement of the joint configuration pose in the direction of the local value of the negative potential gradient field can be proportional to the magnitude of the local value of the negative potential gradient field. The resulting modified joint poses define a modified trajectory in joint space. The singular configuration controller 152 then passes the modified joint space trajectory to a joint position controller 156.

The system (e.g., the joint position controller 156) controls the robot according to the modified joint space trajectory (840). In particular, the joint position controller can be part of the software stack described below.

The enforcement of the control rules is not computationally expensive and can therefore be done with real time constraints without introducing any significant delay. The singular configurations can thus be automatically avoided during execution without introducing any significant delay. This improves the speed and reactivity of robotic operations. The control rules allow even a robot with hard real-time constraints to dynamically account for and avoid singular configurations, even when computing singular configurations is not possible at runtime.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing a task, or a cluster of tasks. A motion plan defines a sequence of configurations that the robot can take to accomplish the task. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform a task corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution engine 150 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report the current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieving the goal.

At a next-highest level, the software stack can include Cartesian position controllers and Cartesian selection controllers. A Cartesian position controller can receive goals in Cartesian space as input and use inverse kinematics solvers to compute an output in joint space. The Cartesian selection controller can then enforce limit policies on the results computed by the Cartesian position controllers before passing the computed results in joint space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached embodiments and the embodiments described above, the following embodiments are also innovative:

Embodiment 1 is a computer-implemented method comprising:
  obtaining a singular configuration of a robot;
  determining a location of an end effector of the robot when the robot is in the singular configuration;
  for each of a plurality of voxels in a workcell, computing a distance from the voxel to the location of the end effector when the robot is in the singular configuration;
  computing a negative potential gradient of the computed distance; and
  generating control rules to be followed by the robot, wherein the control rules, when followed by the robot, offset the trajectory of the robot according to the negative potential gradient.

Embodiment 2 is the method of embodiment 1, further comprising controlling the robot according to the control rules.

Embodiment 3 is the method of embodiment 2, wherein controlling the robot according to the control rules comprises:
  accessing an initial Cartesian trajectory comprising a sequence of Cartesian-space poses in Cartesian space;
  for each Cartesian-space pose of the sequence:
    computing a modified Cartesian-space pose by enforcing the control rules on the Cartesian-space pose; and
    computing a joint-space pose in joint space by applying inverse kinematic to the modified Cartesian-space pose; and
  controlling the robot according to a joint position trajectory, wherein the joint position trajectory is defined by the sequence of joint-space poses.

Embodiment 4 is the method of embodiment 3, wherein computing the modified Cartesian-space pose comprises displacing the Cartesian-space pose in a local direction of the negative potential gradient.

Embodiment 5 is the method of embodiment 3, wherein computing the modified Cartesian-space pose comprises displacing the Cartesian-space pose in a local direction of the negative gradient by a distance proportional to a local magnitude of the negative potential gradient.

Embodiment 6 is the method of any of embodiments 1-5, wherein obtaining the singular configuration of the robot comprises computing the singular configuration of the robot.

Embodiment 7 is the method of embodiment 6, wherein computing the singular configuration of the robot comprises computing a plurality of singular configurations of the robot; and wherein computing the distance from the voxel to the location of the end effector when the robot is in the singular configuration comprises:
  for each of the plurality of singular configurations, computing a distance from the voxel to the location of the end effector when the robot is in the singular configuration; and
  mapping each voxel to the distance from the voxel to the location of the nearest location of the end effector that corresponds to one of the singular configurations.

Embodiment 8 is the method of embodiment 6, wherein computing the singular configuration of the robot comprises:
  computing the Jacobian matrix of the robot, the Jacobian matrix of the robot being computed by computing a time derivative of kinematic equations of the robot;
  identifying a configuration of the robot where the Jacobian matrix does not have an inverse as the singular configuration of the robot.

Embodiment 9 is the method of embodiment 8, wherein the robot comprises a plurality of joints, and wherein the configuration of the robot is defined by an angle of each of the joints of the robot.

Embodiment 10 is the method of any of embodiments 1 to 9, wherein the singular configuration is obtained from a pre-generated database of singular configurations computed for a particular robot model.

Embodiment 11 is a computer-implemented method for controlling a robot at runtime, the method comprising:

accessing a Cartesian trajectory comprising a sequence of Cartesian-space poses in Cartesian space;

for each Cartesian-space pose of the sequence:

computing a modified Cartesian-space pose by enforcing control rules on the Cartesian-space pose, wherein enforcing the control rules on the Cartesian-space pose comprises offsetting the Cartesian-space pose according to a negative potential gradient of a distance from the Cartesian-space pose to a location of an end effector of the robot when the robot is in a singular configuration; and computing a joint-space pose in joint space by applying inverse kinematic to the modified Cartesian-space pose; and controlling the robot according to a joint position trajectory, wherein the joint position trajectory is defined by the sequence of joint-space poses.

Embodiment 12 is the method of embodiment 11, wherein computing the modified Cartesian-space pose comprises displacing the Cartesian-space pose in a local direction of the negative potential gradient.

Embodiment 13 is the method of embodiment 11, wherein computing the modified Cartesian-space pose comprises displacing the Cartesian-space pose in a local direction of the negative gradient by a distance proportional to a local magnitude of the negative potential gradient.

Embodiment 14 is a computer-implemented method comprising:

obtaining a singular configuration of a robot;

for each of a plurality of hypervoxels in a workcell, computing a distance from the hypervoxel to the singular configuration;

computing a negative potential gradient of the computed distance; and generating control rules to be followed by the robot, wherein the control rules, when followed by the robot, offset the trajectory of the robot according to the negative potential gradient.

Embodiment 15 is the method of embodiment 14, further comprising controlling the robot according to the control rules.

Embodiment 16 is the method of embodiment 15, wherein controlling the robot according to the control rules comprises:

accessing an initial Cartesian trajectory comprising a sequence of initial Cartesian-space poses in Cartesian space;

for each initial Cartesian-space pose of the sequence:

computing an initial joint-space pose in joint space by applying inverse kinematic to the initial Cartesian-space pose; and computing a modified joint-space pose by enforcing the control rules on the initial joint-space pose; and controlling the robot according to a joint position trajectory, wherein the joint position trajectory is defined by the sequence of the modified joint-space poses.

Embodiment 17 is the method of embodiment 16, wherein computing the modified joint-space pose comprises displacing the modified joint-space pose in a local direction of the negative gradient by a distance proportional to a local magnitude of the negative potential gradient.

Embodiment 18 is the method of any of embodiments 14 to 17, wherein the robot comprises a plurality of joints, and wherein each of the hypervoxels in the workcell is a discrete element of a configuration space, wherein the configuration space is an ensemble of a plurality of configurations that the robot can take, and wherein each of the plurality of configurations is defined by an angle of each of the joints of the robot.

Embodiment 19 is a computer-implemented method for controlling a robot at runtime, the method comprising:

accessing an initial Cartesian trajectory comprising a sequence of initial Cartesian-space poses in Cartesian space;

for each initial Cartesian-space pose of the sequence:

computing an initial joint-space pose in joint space by applying inverse kinematic to the initial Cartesian-space pose; and computing a modified joint-space pose by enforcing control rules on the initial joint-space pose, wherein enforcing the control rules on the initial joint-space pose comprises offsetting the initial joint-space pose according to a negative potential gradient of a distance from the initial joint-space pose to a singular configuration; and controlling the robot according to a joint position trajectory, wherein the joint position trajectory is defined by the sequence of modified joint-space poses.

Embodiment 20 is the method of embodiment 19, wherein computing the modified joint-space pose comprises displacing the initial joint-space pose in a local direction of the negative gradient by a distance proportional to a local magnitude of the negative potential gradient.

Embodiment 21 is a system comprising: one or more computers and one or more storage devices storing instructions that are operable, when executed by the one or more computers, to cause the one or more computers to perform the method of any one of embodiments 1 to 20.

Embodiment 22 is a computer storage medium encoded with a computer program, the program comprising instructions that are operable, when executed by data processing apparatus, to cause the data processing apparatus to perform the method of any one of embodiments 1 to 20.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
obtaining a singular configuration of a robot;
determining a location of an end effector of the robot when the robot is in the singular configuration;
for each of a plurality of voxels in a workcell, computing a respective distance from the voxel to the location of the end effector when the robot is in the singular configuration;
computing a negative potential gradient of the computed distance, wherein a magnitude of the negative potential gradient is inversely proportional to the distance from the singular configuration; and
generating control rules to be followed by the robot, wherein the control rules, when followed by the robot, cause the robot to avoid the singular configuration by offsetting a trajectory of the robot according to the respective negative potential gradients of the voxels through which the robot end effector travels.

2. The method of claim 1, further comprising controlling the robot according to the control rules.

3. The method of claim 2, wherein controlling the robot according to the control rules comprises:
accessing an initial Cartesian trajectory comprising a sequence of initial Cartesian-space poses in Cartesian space;
for each initial Cartesian-space pose of the sequence:
computing a modified Cartesian-space pose by enforcing the control rules on the initial Cartesian-space pose; and
computing a joint-space pose in joint space by applying inverse kinematic to the modified Cartesian-space pose; and
controlling the robot according to a joint position trajectory, wherein the joint position trajectory is defined by a sequence of the computed joint-space poses.

4. The method of claim 3, wherein computing the modified Cartesian-space pose comprises displacing the initial Cartesian-space pose in a local direction of the negative potential gradient.

5. The method of claim 3, wherein computing the modified Cartesian-space pose comprises displacing the initial Cartesian-space pose in a local direction of the negative potential gradient by a distance proportional to a local magnitude of the negative potential gradient.

6. The method of claim 1, wherein obtaining the singular configuration of the robot comprises computing the singular configuration of the robot.

7. The method of claim 6, wherein computing the singular configuration of the robot comprises computing a plurality of singular configurations of the robot;
and wherein computing the respective distance from a voxel to the location of the end effector when the robot is in the singular configuration comprises:
for each of the plurality of singular configurations, computing a distance from the voxel to the location of the end effector when the robot is in the singular configuration; and
mapping each voxel to the distance from the voxel to the location of a nearest location of the end effector that corresponds to one of the singular configurations.

8. The method of claim 6, wherein computing the singular configuration of the robot comprises:
computing a Jacobian matrix of the robot, the Jacobian matrix of the robot being computed by computing a time derivative of kinematic equations of the robot; and
identifying a configuration of the robot where the Jacobian matrix does not have an inverse as the singular configuration of the robot.

9. The method of claim 8, wherein the robot comprises a plurality of joints, and wherein the configuration of the robot is defined by an angle of each of the joints of the robot.

10. The method of claim 1, wherein the singular configuration is obtained from a pre-generated database of singular configurations computed for a particular robot model.

11. A computer-implemented method for controlling a robot at runtime, the method comprising:
accessing an initial Cartesian trajectory comprising a sequence of initial Cartesian-space poses in Cartesian space;
for each initial Cartesian-space pose of the sequence:
computing a modified Cartesian-space pose by enforcing control rules on the initial Cartesian-space pose, wherein enforcing the control rules on the initial Cartesian-space pose comprises offsetting the initial Cartesian-space pose according to a negative potential gradient of a distance from the initial Cartesian-space pose to a location of an end effector of the robot when the robot is in a singular configuration, wherein a magnitude of the negative potential gradient is inversely proportional to the distance; and
computing a joint-space pose in joint space by applying inverse kinematic to the modified Cartesian-space pose; and
controlling the robot according to a joint position trajectory, wherein the joint position trajectory is defined by a sequence of the computed joint-space poses.

12. The method of claim 11, wherein computing the modified Cartesian-space pose comprises displacing the initial Cartesian-space pose in a local direction of the negative potential gradient.

13. The method of claim 11, wherein computing the modified Cartesian-space pose comprises displacing the initial Cartesian-space pose in a local direction of the negative potential gradient by a distance proportional to a local magnitude of the negative potential gradient.

14. A computer-implemented method comprising:
obtaining a singular configuration of a robot;
for each of a plurality of hypervoxels in a workcell, computing a respective distance from the hypervoxel to the singular configuration;
computing a negative potential gradient of the computed distance, wherein a magnitude of the negative potential gradient is inversely proportional to the distance from the hypervoxel to the singular configuration; and
generating control rules to be followed by the robot, wherein the control rules, when followed by the robot, cause the robot to avoid the singular configuration by offsetting a trajectory of the robot according to the respective negative potential gradients of the hypervoxels.

15. The method of claim 14, further comprising controlling the robot according to the control rules.

16. The method of claim 15, wherein controlling the robot according to the control rules comprises:
- accessing an initial Cartesian trajectory comprising a sequence of initial Cartesian-space poses in Cartesian space;
- for each initial Cartesian-space pose of the sequence:
  - computing an initial joint-space pose in joint space by applying inverse kinematic to the initial Cartesian-space pose; and
  - computing a modified joint-space pose by enforcing the control rules on the initial joint-space pose; and
- controlling the robot according to a joint position trajectory, wherein the joint position trajectory is defined by a sequence of the computed modified joint-space poses.

17. The method of claim 16, wherein computing the modified joint-space pose comprises displacing the modified joint-space pose in a local direction of the negative potential gradient by a distance proportional to a local magnitude of the negative potential gradient.

18. The method of claim 14, wherein the robot comprises a plurality of joints, and wherein each of the hypervoxels in the workcell is a discrete element of a configuration space, wherein the configuration space is an ensemble of a plurality of configurations that the robot can take, and wherein each of the plurality of configurations is defined by an angle of each of the joints of the robot.

19. A computer-implemented method for controlling a robot at runtime, the method comprising:
- accessing an initial Cartesian trajectory comprising a sequence of initial Cartesian-space poses in Cartesian space;
- for each initial Cartesian-space pose of the sequence:
  - computing an initial joint-space pose in joint space by applying inverse kinematic to the initial Cartesian-space pose; and
  - computing a modified joint-space pose by enforcing control rules on the initial joint-space pose, wherein enforcing the control rules on the initial joint-space pose comprises offsetting the initial joint-space pose according to a negative potential gradient of a distance from the initial joint-space pose to a singular configuration, wherein a magnitude of the negative potential gradient is inversely proportional to the distance; and
- controlling the robot according to a joint position trajectory, wherein the joint position trajectory is defined by a sequence of the computed modified joint-space poses.

20. The method of claim 19, wherein computing the modified joint-space pose comprises displacing the initial joint-space pose in a local direction of the negative potential gradient by a distance proportional to a local magnitude of the negative potential gradient.

21. A computing system comprising a plurality of computers and one or more storage devices storing instructions that are operable, when executed by the plurality of computers, to cause the plurality of computers perform operations comprising:
- obtaining a singular configuration of a robot;
- determining a location of an end effector of the robot when the robot is in the singular configuration;
- for each of a plurality of voxels in a workcell, computing a respective distance from the voxel to the location of the end effector when the robot is in the singular configuration;
- computing a negative potential gradient of the computed distance, wherein a magnitude of the negative potential gradient is inversely proportional to the distance from the singular configuration; and
- generating control rules to be followed by the robot, wherein the control rules, when followed by the robot, cause the robot to avoid the singular configuration by offsetting a trajectory of the robot according to the respective negative potential gradients of the voxels through which the robot end effector travels.

22. One or more non-transitory computer storage media encoded with computer program instructions that when executed by a distributed system comprising a plurality of computers cause the plurality of computers to perform operations comprising:
- obtaining a singular configuration of a robot;
- determining a location of an end effector of the robot when the robot is in the singular configuration;
- for each of a plurality of voxels in a workcell, computing a respective distance from the voxel to the location of the end effector when the robot is in the singular configuration;
- computing a negative potential gradient of the computed distance, wherein a magnitude of the negative potential gradient is inversely proportional to the distance from the singular configuration; and
- generating control rules to be followed by the robot, wherein the control rules, when followed by the robot, cause the robot to avoid the singular configuration by offsetting a trajectory of the robot according to the respective negative potential gradients of the voxels through which the robot end effector travels.

23. A computing system comprising a plurality of computers and one or more storage devices storing instructions that are operable, when executed by the plurality of computers, to cause the plurality of computers perform operations comprising:
- accessing an initial Cartesian trajectory comprising a sequence of initial Cartesian-space poses in Cartesian space;
- for each initial Cartesian-space pose of the sequence:
  - computing a modified Cartesian-space pose by enforcing control rules on the initial Cartesian-space pose, wherein enforcing the control rules on the initial Cartesian-space pose comprises offsetting the initial Cartesian-space pose according to a negative potential gradient of a distance from the initial Cartesian-space pose to a location of an end effector of a robot when the robot is in a singular configuration, wherein a magnitude of the negative potential gradient is inversely proportional to the distance; and
  - computing a joint-space pose in joint space by applying inverse kinematic to the modified Cartesian-space pose; and
- controlling the robot according to a joint position trajectory, wherein the joint position trajectory is defined by a sequence of the computed joint-space poses.

24. One or more non-transitory computer storage media encoded with computer program instructions that when executed by a distributed system comprising a plurality of computers cause the plurality of computers to perform operations comprising:
- accessing an initial Cartesian trajectory comprising a sequence of initial Cartesian-space poses in Cartesian space;
- for each initial Cartesian-space pose of the sequence:
  - computing a modified Cartesian-space pose by enforcing control rules on the initial Cartesian-space pose, wherein enforcing the control rules on the initial Cartesian-space pose comprises offsetting the initial Cartesian-space pose according to a negative potential gradient of a distance from the initial Cartesian-space pose to a location of an end effector of a robot when the robot is in a singular configuration, wherein a magnitude of the negative potential gradient is inversely proportional to the distance; and computing a joint-space pose in joint space by applying inverse kinematic to the modified Cartesian-space pose; and controlling the robot according to a joint position trajectory, wherein the joint position trajectory is defined by a sequence of the computed joint-space poses.

25. A computing system comprising a plurality of computers and one or more storage devices storing instructions that are operable, when executed by the plurality of computers, to cause the plurality of computers perform operations comprising:

obtaining a singular configuration of a robot;

for each of a plurality of hypervoxels in a workcell, computing a respective distance from the hypervoxel to the singular configuration;

computing a negative potential gradient of the computed distance, wherein a magnitude of the negative potential gradient is inversely proportional to the distance from the hypervoxel to the singular configuration; and generating control rules to be followed by the robot, wherein the control rules, when followed by the robot, cause the robot to avoid the singular configuration by offsetting a trajectory of the robot according to the respective negative potential gradients of the hypervoxels.

26. One or more non-transitory computer storage media encoded with computer program instructions that when executed by a distributed system comprising a plurality of computers cause the plurality of computers to perform operations comprising:

obtaining a singular configuration of a robot;

for each of a plurality of hypervoxels in a workcell, computing a respective distance from the hypervoxel to the singular configuration;

computing a negative potential gradient of the computed distance, wherein a magnitude of the negative potential gradient is inversely proportional to the distance from the hypervoxel to the singular configuration; and generating control rules to be followed by the robot, wherein the control rules, when followed by the robot, cause the robot to avoid the singular configuration by offsetting a trajectory of the robot according to the respective negative potential gradients of the hypervoxels.

27. A computing system comprising a plurality of computers and one or more storage devices storing instructions that are operable, when executed by the plurality of computers, to cause the plurality of computers perform operations comprising:

accessing an initial Cartesian trajectory comprising a sequence of initial Cartesian-space poses in Cartesian space;

for each initial Cartesian-space pose of the sequence:
computing an initial joint-space pose in joint space by applying inverse kinematic to the initial Cartesian-space pose; and computing a modified joint-space pose by enforcing control rules on the initial joint-space pose, wherein enforcing the control rules on the initial joint-space pose comprises offsetting the initial joint-space pose according to a negative potential gradient of a distance from the initial joint-space pose to a singular configuration, wherein a magnitude of the negative potential gradient is inversely proportional to the distance; and controlling a robot according to a joint position trajectory, wherein the joint position trajectory is defined by a sequence of the computed modified joint-space poses.

28. One or more non-transitory computer storage media encoded with computer program instructions that when executed by a distributed system comprising a plurality of computers cause the plurality of computers to perform operations comprising:

accessing an initial Cartesian trajectory comprising a sequence of initial Cartesian-space poses in Cartesian space;

for each initial Cartesian-space pose of the sequence:
computing an initial joint-space pose in joint space by applying inverse kinematic to the initial Cartesian-space pose; and computing a modified joint-space pose by enforcing control rules on the initial joint-space pose, wherein enforcing the control rules on the initial joint-space pose comprises offsetting the initial joint-space pose according to a negative potential gradient of a distance from the initial joint-space pose to a singular configuration, wherein a magnitude of the negative potential gradient is inversely proportional to the distance; and controlling a robot according to a joint position trajectory, wherein the joint position trajectory is defined by a sequence of the computed modified joint-space poses.

* * * * *